US009591094B2

(12) United States Patent
Eicher et al.

(10) Patent No.: US 9,591,094 B2
(45) Date of Patent: Mar. 7, 2017

(54) CACHING OF MACHINE IMAGES

(71) Applicant: Amazon Technologies, Inc., Reno, NV (US)

(72) Inventors: Anton André Eicher, Western Cape (ZA); Matthew James Eddey, Seattle, WA (US); Richard Alan Hamman, Western Cape (ZA)

(73) Assignee: Amazon Technologies, Inc., Seattle, WA (US)

( * ) Notice: Subject to any disclaimer, the term of this patent is extended or adjusted under 35 U.S.C. 154(b) by 114 days.

(21) Appl. No.: 14/482,841

(22) Filed: Sep. 10, 2014

(65) Prior Publication Data
US 2016/0072910 A1 Mar. 10, 2016

(51) Int. Cl.
*H04L 29/08* (2006.01)
*G06F 9/48* (2006.01)

(52) U.S. Cl.
CPC ......... *H04L 67/2842* (2013.01); *G06F 9/485* (2013.01); *H04L 67/325* (2013.01)

(58) Field of Classification Search
CPC H04L 67/00–67/2852; G06F 9/45558–9/4856
See application file for complete search history.

(56) References Cited

U.S. PATENT DOCUMENTS

| | | | | |
|---|---|---|---|---|
| 8,793,684 B2* | 7/2014 | Breitgand | ........... | G06F 9/45558 718/1 |
| 2009/0125902 A1* | 5/2009 | Ghosh | ................ | G06F 9/45533 718/1 |
| 2013/0007187 A1* | 1/2013 | Esteban | ............ | G06F 17/30017 709/213 |
| 2013/0055258 A1* | 2/2013 | De | ...................... | G06F 9/45533 718/1 |
| 2014/0245319 A1* | 8/2014 | Fellows | ................... | G06F 8/45 718/104 |
| 2015/0143363 A1* | 5/2015 | Gombert | ............. | G06F 9/45533 718/1 |

* cited by examiner

*Primary Examiner* — Nicholas Taylor
*Assistant Examiner* — Clayton R Williams
(74) *Attorney, Agent, or Firm* — Thorpe North & Western LLP

(57) ABSTRACT

Technology is described for reducing computing instance launch times. A computing instance that is expected to be launched in a computing service environment during a defined time period may be identified. A machine image associated with the computing instance may be determined to be cached in the computing service environment using a launch time prediction model to reduce a launch time for launching the computing instance as compared to not caching the machine image. At least one physical host in the computing service environment that is available to cache the machine image may be selected to lower the launch time of the computing instance as predicted by the launch time prediction model. The machine image may be stored in the physical host in order to minimize the launch time for launching the computing instance in the computing service environment, using the processor.

20 Claims, 10 Drawing Sheets

CACHING OF MACHINE IMAGES

BACKGROUND

The advent of virtualization technologies for computing resources has provided benefits with respect to managing large-scale computing resources for many customers with diverse needs. In addition, virtualization technologies have allowed various computing resources or computing services to be efficiently and securely shared by multiple customers. For example, virtualization technologies may allow a single physical host (e.g., a single physical computing machine) to be shared among multiple customers by providing each customer with one or more computing instances hosted by the single physical host using a hypervisor. A computing instance may be a guest machine acting as a distinct logical computing system that provides a customer with the perception that the customer is the sole operator and administrator of a given virtualized hardware computing resource.

A request to launch a computing instance may entail identifying available computing resources (e.g., a computing slot in a hypervisor) on which the computing instance may be executed. For example, one or more physical hosts (e.g., server computers or physical computing machines) may be queried to determine whether sufficient computing resources exist on a physical computing machine to launch and execute a computing instance and whether a physical host meets additional specified criteria (e.g., disaster mitigation criteria, licensing criteria, etc.) for the group of physical hosts. In a case where a physical host is identified as having computing resources available to execute the computing instance and meeting the specific criteria, the computing instance may be launched on the physical host, and a customer may be notified that the computing instance has been launched.

DETAILED DESCRIPTION

Figure 1:
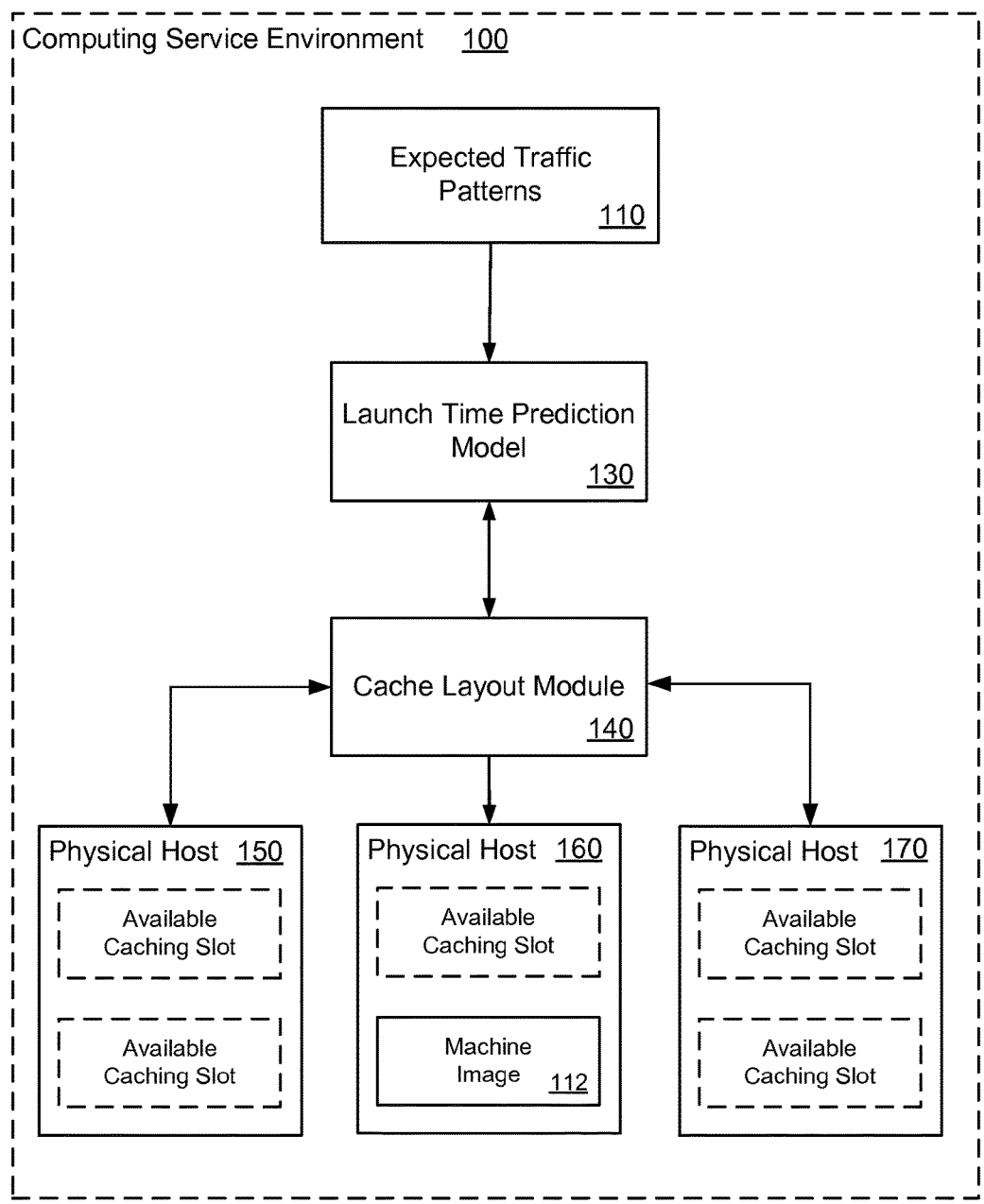
FIG. 1 illustrates a system and related operations for using launch time predictions to organize caching of machine images in order to reduce computing instance launch times in a computing service environment according to an example of the present technology.

Technology is described for using launch time predictions to organize caching of machine images in a computing service environment. A machine image may provide information for launching a computing instance in the computing service environment (i.e., the computing instance may be launched from the machine image). For example, the machine image may indicate a type of data store used for launching the computing instance, launch permissions, etc. The machine image may be cached or stored on a physical host, also known as a server computer, in the computing service environment in order to reduce a launch time for launching the computing instance. In other words, caching the machine image local to the physical host that is launching the associated computing instance may provide a relatively faster launch time for the computing instance as compared to retrieving the machine image from a data store over a network. The term "launch time" generally refers to a period of time between receiving a request to launch the computing instance and booting the machine image associated with the computing instance onto a physical host that is selected to launch the computing instance.

In one configuration, expected traffic patterns for the computing service environment may be identified. The expected traffic patterns may indicate particular computing instances that are likely to be launched in the computing service environment during a defined time period (and possibly a defined geography). For example, the expected traffic patterns may indicate that computing instance A is likely to be launched at 8:30 AM on Tuesday. In one example, the expected traffic patterns may be identified using heuristic rules relating to past traffic patterns in the computing service environment. In another example, the expected traffic patterns may be identified using a machine learning model that uses historical traffic information for the computing service environment in order to predict expected traffic patterns for the computing service environment.

The expected traffic patterns for the computing service environment (e.g., features for the computing instances expected to be launched during the defined time period) may be provided to a launch time prediction model. The launch time prediction model may determine whether preemptively caching the machine images associated with the computing instances at predefined locations in the computing service environment may result in reduced estimated launch times for launching the computing instances. In other words, the launch time prediction model may determine whether caching the machine images at particular locations may reduce estimated launch times as compared to not caching the machine images or caching the machine images at other locations that do not improve the estimated launch times. The predefined locations may include particular physical hosts, groups of physical hosts or localized storage locations (e.g., localized network attached storage) in the computing service environment. As an example, the launch time prediction model may be a regression model that uses historical launch time information, including historical computing instance caching information, for a plurality of previously launched computing instances for determining the estimated launch times for the computing instances expected to be launched in the computing service environment.

As a non-limiting example, computing instance A may be likely to be launched in the computing service environment according to the expected traffic patterns. Physical host X and physical host Y may be identified as being available to cache the machine image associated with computing instance A. The launch time prediction model may determine that caching the machine image on physical host X may result in a predicted launch time of 60 seconds for computing instance A. In addition, the launch time prediction model may determine that caching the machine image on physical host Y may result in a predicted launch time of 30 seconds for computing instance A. The machine image may be cached in physical host Y with the expectation that the computing instance A may be requested by a customer in the future and that the machine image is likely to launch the fastest when the computing image is cached on physical host Y.

Thus, the physical host that is predicted to provide a reduced launch time for the computing instance when the machine image associated with the computing instance is cached on the physical host, as determined using the launch time prediction model, may be selected to cache the machine image. The physical host that is selected to cache the machine image may be included in a cache layout. The physical host that is included in the cache layout may be available and/or capable of caching the machine image. In one example, the cache layout may identify a single physical host that is available to cache the machine image. Alternatively, the cache layout may identify a group of physical hosts that are available to cache the machine image. The physical host included in the cache layout may have available computing slots (e.g., computing resources) used to execute the computing instance. In addition, the available computing slots may support a type or size of the machine image.

FIG. 1 is a diagram that illustrates caching machine images to reduce computing instance launch times in a computing service environment 100. Expected traffic patterns 110 for launching computing instances may be identified for the computing service environment 100. The expected traffic patterns 110 may indicate a computing instance that is likely to be launched in the computing service environment 100 during a defined time period (and possibly a defined geography). The computing instance may be associated with machine image 112. In one example, the features of the computing instance and/or the machine image 112 may be provided to a launch time prediction model 130. The features may include whether the machine image 112 is cached, a size of the computing instance, where the machine image may be cached, etc. The launch time prediction model 130 may determine, based on the features of the computing instance and/or the machine image 112, that caching the machine image 112 at predefined locations in the computing service environment 100 may reduce a launch time for the computing instance. The predefined locations may include certain physical hosts or localized storage locations connected via a high speed network connection, such as network attached storage (NAS) on a server rack or in buildings with servers.

A cache layout module 140 may use the launch time prediction model 130 to determine a cache layout for caching the machine image 112 in the computing service environment 100. The cache layout may include a physical host (or physical hosts) in the computing service environment 100 having a caching slot that is available and/or capable of caching the machine image 112. In addition, the physical host selected for use in the cache layout may provide a reduced launch time for launching the computing instance when the machine image 112 associated with the computing instance is cached on the physical host.

As a non-limiting example, the computing service environment 100 may include multiple physical hosts 150, 160 and 170. The cache layout module 140 may use the launch time prediction model 130 to determine that caching the machine image 112 on the physical host 150 may result in an estimated launch time of 180 seconds for the computing instance. In addition, the cache layout module 140 may determine that caching the machine image 112 on the physical host 160 or on the physical host 170 may result in estimated launch times of 165 seconds and 190 seconds, respectively, for the computing instance. Therefore, the cache layout module 140 may select the physical host 160 for caching the machine image 112 (i.e., the cache layout includes the physical host 160) in order to achieve a reduced launch time for launching the computing instance as compared to caching the machine image 112 on the physical host 150 or the physical host 170.

Figure 2:
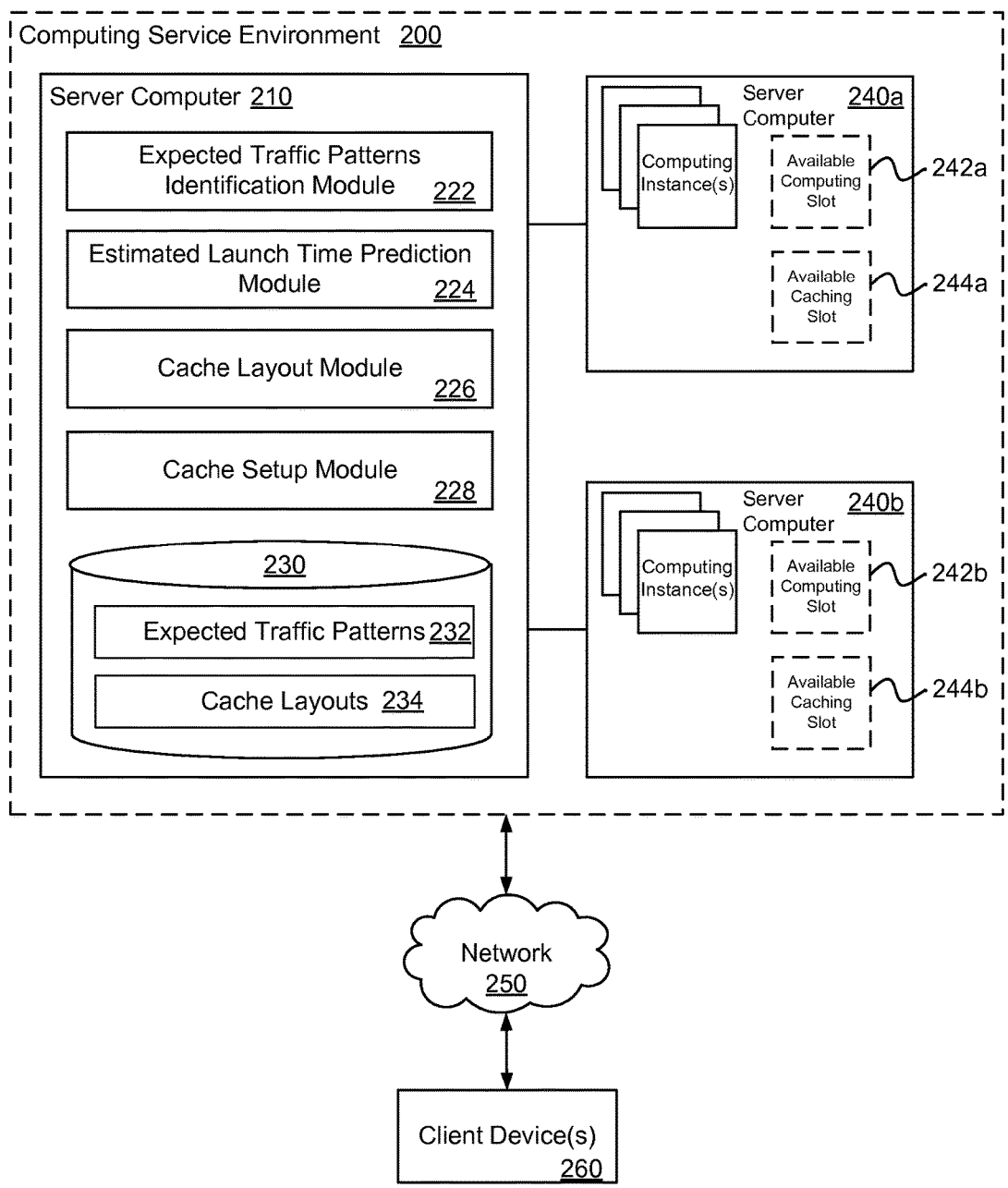
FIG. 2 is a block diagram that illustrates various components included in a system for using launch time predictions to organize caching of machine images in order to reduce computing instance launch times in a computing service environment according to an example of the present technology.

FIG. 2 illustrates components of an example computing service environment 200 according to one example of the present technology. The computing service environment 200 may include a server computer 210 in communication with a number of client devices 260 via a network 250, and the server computer may be part of the control plane for the service provider environment 200. The server computer 210 may contain a data store 230 and a number of modules used to determine a cache placement of a machine image. In addition, the computing service environment 200 may include a number of server computers 240a-b executing a plurality of computing instances.

The server computers 240a-b may have available computing slots 242a-b (e.g., idle computing resources) that may be used to execute a computing instance. The available computing slots 242a-b may be allocated to customers who may then utilize an available computing slot 242a-b to execute a computing instance. In addition, the server computers 240a-b may have available caching slots 244a-b that may be used to cache a machine image associated with a computing instance to be executed. Examples of computing instances may include on-demand computing instances, reserved computing instances and interruptible computing instances. An on-demand computing instance may be a computing instance that a customer may purchase and execute upon request. A reserved computing instance may be a reservation for a computing instance that a customer may purchase for a defined period of time making the computing instance available when the customer requests the computing instance, and an interruptible computing instance may be a computing instance that may be executed in a computing slot 242a-b not being used by another computing instance type unless the price being paid for the interruptible computing instance falls below a current bid price.

The data stored in the data store 230 may include expected traffic patterns 232 that are based on historical data. The expected traffic patterns 232 may identify computing instances that are expected to be launched in the computing service environment 200 during a defined time period. For example, the expected traffic patterns 232 may indicate that computing instance Z is likely to be launched on Saturday at 7 PM. In one example, the expected traffic patterns 232 may be determined based on historical traffic information for the computing service environment 200. For example, the expected traffic patterns 232 may indicate that computing instance Z is likely to be launched on Saturday at 7 PM because computing instance Z has been launched at similar times for the past two months. In one configuration, the expected traffic patterns 232 may be identified using heuristic rules relating to past traffic patterns in the computing service environment 200. In yet another configuration, a machine learning model may be trained to determine the expected traffic patterns 232 using historical traffic patterns for the computing service environment 200.

The data stored in the data store 230 may include cache layouts 234 for computing instances to be launched in the computing service environment 200. The cache layouts 234 may identify physical hosts in the computing service environment 200 that are selected for caching of machine images because the physical hosts are available and/or capable of caching machine images associated with the computing instances. The cache layouts 234 may identify a single physical host that is available to cache the machine images or a group of physical hosts that are available to cache the machine images. The physical hosts included in the cache layouts 234 may have available computing slots (e.g., computing resources used to execute the computing instance) that support defined types or sizes of the machine images.

In one example, the cache layouts 234 may identify physical hosts in a particular region or zone for caching the machine images. In addition, the cache layouts 234 may be modified or updated in response to changes in the computing service environment 200. For example, when physical hosts that were previously identified in the cache layouts 234 for caching the machine images become overloaded or full (e.g., resulting in decreased launch times), the cache layouts 234 may be updated to include other physical hosts for caching the machine images that result in reduced launch times for the computing instances. Thus, the cache layouts 234 may be periodically updated.

The server computer 210 may include an expected traffic patterns identification module 222, an estimated launch time prediction module 224, a cache layout module 226, a cache setup module 228, and other applications, services, processes, systems, engines, or functionality not discussed in detail herein. The expected traffic patterns identification module 222 may be configured to identify expected traffic patterns in the computing service environment 200. The expected traffic patterns may indicate a machine image associated with a computing instance that is likely to be launched in the computing service environment during a defined time period. The expected traffic patterns identification module 222 may identify the expected traffic patterns using a machine learning model that predicts the expected traffic patterns using historical traffic information for the computing service environment 200. In one example, the expected traffic patterns identification module 222 may user heuristic rules to identify the expected traffic patterns in the computing service environment 200.

The estimated launch time prediction module 224 may determine that caching the machine image in a predefined location in the computing service environment 200 may reduce a launch time for the computing instance as compared to not caching the machine image. The predefined location may include a particular physical host, a group of physical hosts or a local storage component relative to the physical hosts in the computing service environment 200. In one example, the estimated launch time prediction module 224 may use a launch time prediction model to determine whether or not to cache the machine image at the predefined location. In other words, the launch time prediction model may provide an estimated launch time for launching the computing instance when the machine image associated with the computing instance is cached on a particular physical host.

The cache layout module 226 may be configured to determine a cache layout to enable caching of the machine image in the computing service environment 200. The cache layout may identify physical hosts at the predefined location that are available to cache the machine image in order to reduce the launch time for the computing instance associated with the machine image. The physical hosts indicated in the cache layout may have sufficient resources and capabilities to cache the machine image. In one example, the cache layout module 226 may select the physical hosts to be included in the cache layout using the launch time prediction model. In other words, a physical host in the cache layout may have been identified by the launch time prediction as being likely to provide a reduced launch time for the computing instance when the machine image is cached on the physical host. In addition, the cache layout module 226 may identify various characteristics of the physical hosts (e.g., hardware types, addressing) when selecting the physical hosts to be included in the cache layout. As another example, the cache layout module 226 may use a genetic technique or particle swarm optimization when selecting the physical hosts to be included in the cache layout. Thus, the cache layout module 226 may use the genetic technique or particle swarm optimization to select physical hosts that provide reduced launch times when machine images are cached on the physical hosts.

The cache setup module 228 may be configured to store the machine image on at least one physical host in the computing environment 200 according to the cache layout. In one example, the cache setup module 228 may store the machine image on a physical host associated with certain topology layers (e.g., a particular region, zone, server rack, and physical host). Accordingly, there may be localized storage that is associated with a specific topology layer. For instance, a caching device (e.g., an NAS) may be provided at the region, zone, or server rack level. By preemptively caching the machine image, the launch time for launching the computing instance may be reduced. In one example, the cache setup module 228 may send the machine image to the caching location prior to a defined time period when the computing instance is expected to be launched and the computing instance may reside in the cache location for a defined time period. When the defined time period has ended, the cache setup module 228 may clear the machine image from the cache. As a non-limiting example, when a particular computing instance is expected to be launched on Saturday at 8 AM-9 AM, the machine image associated with the computing instance may be cached on the physical host on Saturday between 6 AM to 10 AM, and thereafter removed from the physical host.

The various processes and/or other functionality contained within the computing service environment 200 may be executed on one or more processors that are in communication with one or more memory modules. The computing service environment 200 may include a number of computing devices that are arranged, for example, in one or more server banks, computer banks or other arrangements. The computing devices may support a computing environment using hypervisors, virtual machine monitors (VMMs) and other virtualization software.

The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

The network 250 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

Figure 3:
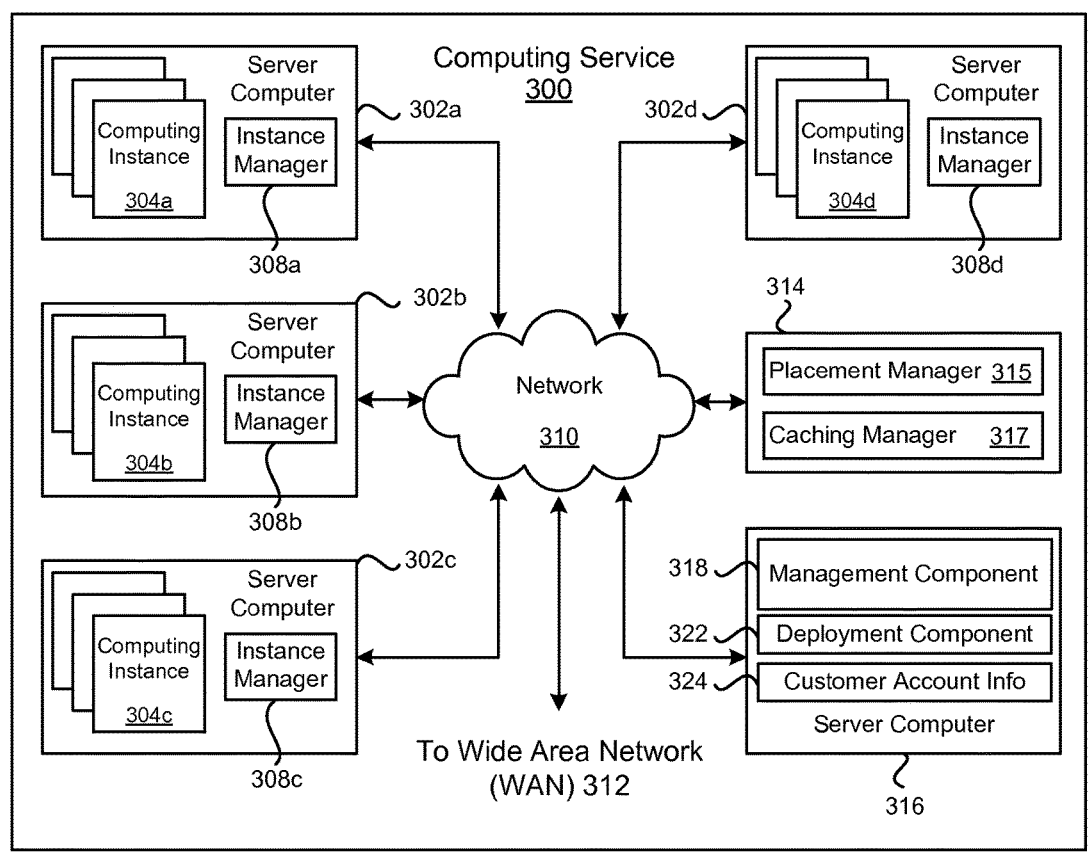
FIG. 3 is a block diagram of a computing service environment according to an example of the present technology.

FIG. 3 is a block diagram illustrating an example computing service 300 that may be used to execute and manage a number of computing instances 304a-d. In particular, the computing service 300 depicted illustrates one environment in which the technology described herein may be used. The computing service 300 may be one type of environment that includes various virtualized service resources that may be used, for instance, to host computing instances 304a-d.

The computing service 300 may be capable of delivery of computing, storage and networking capacity as a software service to a community of end recipients. In one example, the computing service 300 may be established for an organization by or on behalf of the organization. That is, the computing service 300 may offer a "private cloud environment." In another example, the computing service 300 may support a multi-tenant environment, wherein a plurality of customers may operate independently (i.e., a public cloud environment). Generally speaking, the computing service 300 may provide the following models: Infrastructure as a Service ("IaaS"), Platform as a Service ("PaaS"), and/or Software as a Service ("SaaS"). Other models may be provided. For the IaaS model, the computing service 300 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 300. End customers may access the computing service 300 using networked client devices, such as desktop computers, laptops, tablets, smartphones, etc. running web browsers or other lightweight client applications, for example. Those familiar with the art will recognize that the computing service 300 may be described as a "cloud" environment.

The particularly illustrated computing service 300 may include a plurality of server computers 302a-d. The server computers 302a-d may also be known as physical hosts. While four server computers are shown, any number may be used, and large data centers may include thousands of server computers. The computing service 300 may provide computing resources for executing computing instances 304a-d. Computing instances 304a-d may, for example, be virtual machines. A virtual machine may be an instance of a software implementation of a machine (i.e. a computer) that executes applications like a physical machine. In the example of a virtual machine, each of the server computers 302a-d may be configured to execute an instance manager 308a-d capable of executing the instances. The instance manager 308a-d may be a hypervisor, virtual machine monitor (VMM), or another type of program configured to enable the execution of multiple computing instances 304a-d on a single server. Additionally, each of the computing instances 304a-d may be configured to execute one or more applications.

One or more server computers 314 and 316 may be reserved to execute software components for managing the operation of the computing service 300 and the computing instances 304a-d. For example, the server computer 314 may execute a computing instance placement manager 315 that may perform functions, such as querying the server computers 302a-d for available computing slots and computing group state information, as well as determining a placement of a computing instance 304a-d in an available computing slot. In addition, the server computer 314 may execute a machine image caching manager 317 that determines which of the server computers 302 a-d is to cache a machine image associated with the computing instance 304a-d.

A server computer 316 may execute a management component 318. A customer may access the management component 318 to configure various aspects of the operation of the computing instances 304a-d purchased by a customer. For example, the customer may setup computing instances 304a-d and make changes to the configuration of the computing instances 304a-d.

A deployment component 322 may be used to assist customers in the deployment of computing instances 304a-d. The deployment component 322 may have access to account information associated with the computing instances 304a-d, such as the name of an owner of the account, credit card information, country of the owner, etc. The deployment component 322 may receive a configuration from a customer that includes data describing how computing instances 304*a-d* may be configured. For example, the configuration may include an operating system, provide one or more applications to be installed in computing instances 304*a-d*, provide scripts and/or other types of code to be executed for configuring computing instances 304*a-d*, provide cache logic specifying how an application cache should be prepared, and other types of information. The deployment component 322 may utilize the customer-provided configuration and cache logic to configure, prime, and launch computing instances 304*a-d*. The configuration, cache logic, and other information may be specified by a customer accessing the management component 318 or by providing this information directly to the deployment component 322.

Customer account information 324 may include any desired information associated with a customer of the multi-tenant environment. For example, the customer account information may include a unique identifier for a customer, a customer address, billing information, licensing information, customization parameters for launching instances, scheduling information, etc. As described above, the customer account information 324 may also include security information used in encryption of asynchronous responses to API requests. By "asynchronous" it is meant that the API response may be made at any time after the initial request and with a different network connection.

A network 310 may be utilized to interconnect the computing service 300 and the server computers 302*a-d*, 316. The network 310 may be a local area network (LAN) and may be connected to a Wide Area Network (WAN) 312 or the Internet, so that end customers may access the computing service 300. In addition, the network 310 may include a virtual network overlaid on the physical network to provide communications between the servers 302*a-d*. The network topology illustrated in FIG. 3 has been simplified, as many more networks and networking devices may be utilized to interconnect the various computing systems disclosed herein.

Figure 4:
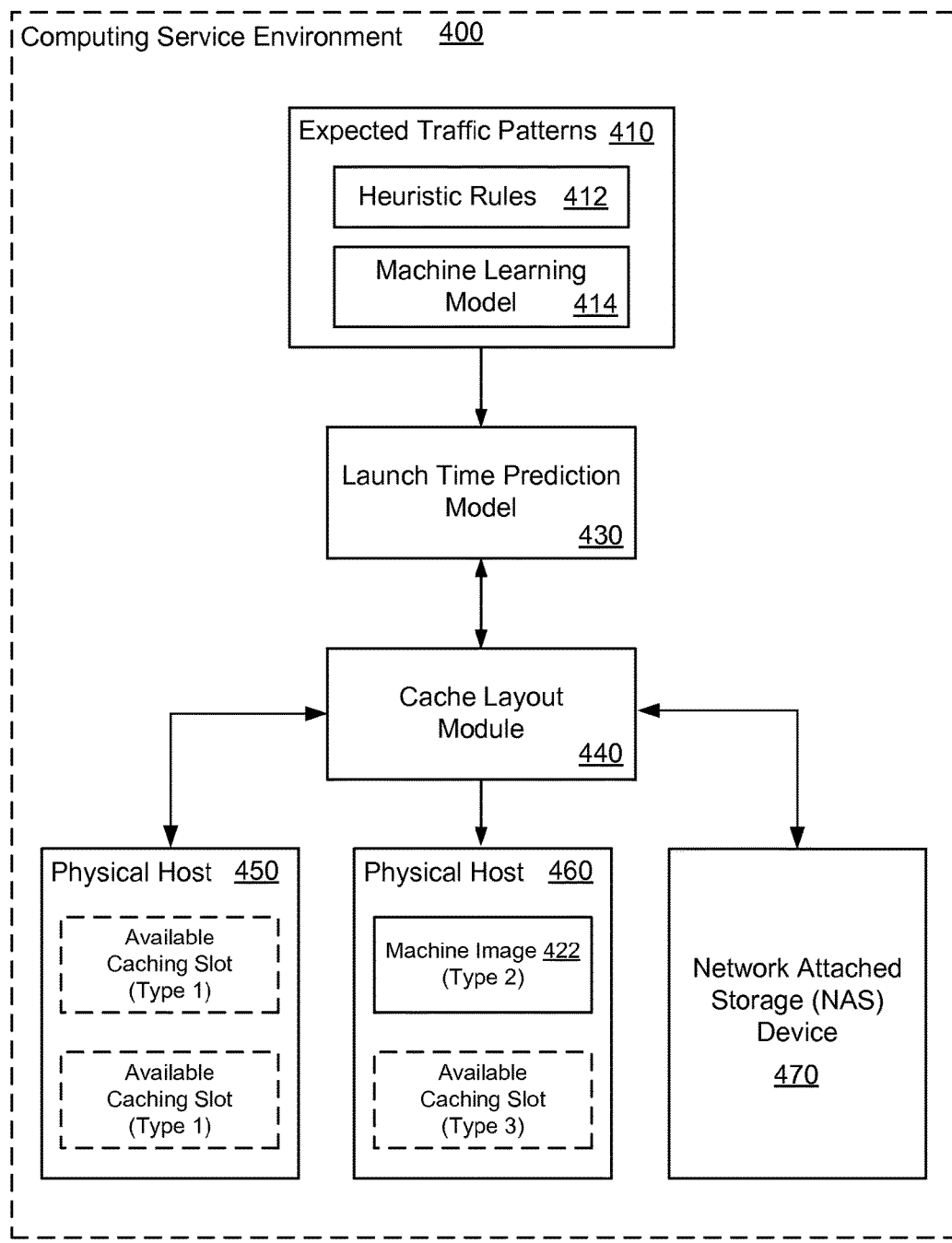
FIG. 4 illustrates a system and related operations for using launch time predictions to organize caching of machine images in order to reduce computing instance launch times in a computing service environment according to an example of the present technology.

FIG. 4 illustrates a system and related operations for caching machine images in a computing service environment 400 in order to reduce computing instance launch times. A machine image may provide information for launching a computing instance in the computing service environment (i.e., the computing instance may be launched from the machine image). For example, the machine image may indicate a type of data store used for launching the computing instance, launch permissions, etc. The machine image may be stored on at least one physical host in the computing service environment 400 in order to reduce the computing image launch time. In other words, locally caching the machine image may provide for a relatively faster computing instance launch time as compared to fetching the machine image from a separate data store over a network.

Expected traffic patterns 410 for the computing service environment 400 may be identified. The expected traffic patterns 410 may indicate that the computing instance is expected to be launched at a certain time period and/or in a certain geographic location. As a non-limiting example, the expected traffic patterns 410 may indicate that a computing instance is likely to be launched on Monday at 8 AM. In one configuration, the expected traffic patterns 410 may be identified using heuristic rules 412. The heuristic rules 412 may relate to past traffic patterns for the computing service environment 400. As an example, using the heuristic rules 412 may infer that the computing instance is likely to be launched on Monday at 8 AM if the computing instance has been launched at similar times in the past. In another configuration, the expected traffic patterns 410 may be identified using a machine learning model 414. The machine learning model 414 may use historical traffic information from the computing service environment 400 in order to predict the expected traffic patterns 410 in the computing service environment 400.

In one example, instance features related to the computing instance that is expected to be launched during the certain time period may be provided to a launch time prediction model 430. The instance features may be related to a machine image 422 used by the computing instance and/or the computing instance to be launched in the computing service environment 400. For example, the instance features may include a size of the computing instance, an architecture type of the computing instance (e.g., 32-bit architectures or 64-bit architecture), a virtualization type of the computing instance (e.g., paravirtualization or hardware virtual machine) and/or a type of data store used by the computing instance.

The launch time prediction model 430 may determine, based on the instance features, whether preemptively caching the machine image 422 at a predefined location in the computing service environment 400 may reduce the launch time for the computing instance. In addition, the launch time prediction model 430 may determine that caching the machine image 422 at a particular location (e.g., a particular physical host) may reduce the launch time as compared to caching the machine image 422 at another location in the computing service environment 400. The predefined location may include a particular physical host or a group of physical hosts in the computing service environment 400.

The launch time prediction model 430 may be a machine learning model that is trained by historical launch time information for a plurality of previously launched computing instances and the launch time prediction model 430 may be used for determining the estimated launch times for the computing instances expected to be launched in the computing service environment 400. So, the launch time prediction model 430 may use historical launch time information related to previous launch times when the machine image was cached, previous launch times when the computing instance was not cached, previous launch times when the machine image was cached at particular locations, etc. in training to predict the estimated launch times for the computing instances expected to be launched. In one example, the launch time prediction model 430 may be a regression model used for predicting the estimated launch times.

As a non-limiting example, the computing service environment may include physical hosts 450, 460. The launch time prediction model 430 may provide information to help determine whether to cache the machine image 422 on one of the physical hosts 450, 460 in order to reduce the launch time of the computing instance. The launch time prediction model 430 may determine that caching the machine image 422 on the physical host 450 may result in an estimated launch time of 30 seconds for the computing instance. In addition, the launch time prediction model 430 may determine that caching the machine image 422 on the physical host 460 may result in estimated launch times of 25 seconds. The launch time prediction model 430 may use various types of information, in addition to whether the machine image 422 is cached, when predicting the estimated launch times, such as a size of the computing instance, a number of simultaneous launches at the physical hosts, a percentage of occupancy at the physical hosts, etc.

A cache layout module 440 may use the prediction information from the launch time prediction model 430 to determine a cache layout for caching the machine image 422 in the computing service environment 400. The cache layout may include at least one physical host that is selected to cache the machine image 422 in order to reduce the launch time for the computing instance. In order to determine the cache layout, the cache layout module 440 may identify at least one physical host at the predefined location in the computing service environment 400 that is available and/or capable of caching the machine image 422. The cache layout module 440 may, via the launch time prediction model 430, compare the estimated launch times for launching the machine image 422 on each of the available physical hosts to determine if the machine image 422 are to be cached on each of the respective physical hosts. The cache layout module 440 may compare the estimated launch times for launching the computing instance on the physical hosts and select the physical host that can provide the reduced launch time for the computing instance. In other words, the physical host that can provide the reduced launch time may be included in the cache layout. In one example, dozens or hundreds of copies of the same machine image 422 may be cached in a group of physical hosts in order to provide the reduced launch time.

In one configuration, the cache layout module 440 may use a genetic technique or particle swarm optimization to identify the physical host or the group of physical hosts in the computing service environment 400 that can cache the machine image 422 in order to provide the reduced launch time for the computing instance. The machine image 422 may be stored on the selected physical host and loaded from the physical host when the computing instance is launched in the computing service environment 400.

As a non-limiting example, the cache layout module 440 may determine that the physical hosts 450, 460 are available to cache the machine image 422. The cache layout module 440 may determine, via the launch time prediction model 430, that caching the machine image 422 on one of the physical hosts 450, 460 may result in an estimated launch time of 30 seconds, 25 seconds or 40 seconds, respectively. Therefore, the cache layout module 440 may select the physical host 460 to be included in the cache layout because caching the machine image 422 on the physical host 460 may result in a lower launch time as compared to caching the machine image 422 on the physical host 450. Alternatively, the cache layout module 440 may determine to cache the machine image 422 on a network attached storage (NAS) device 470 included in the computing service environment 400 in order to lower the launch time.

In one example, the cache layout module 440 may store the machine image 422 in an available caching slot of the physical host that is capable of supporting the size of the machine image 422. For example, the physical host 450 may include available caching slots that are of a first type. The physical host 460 may include available caching slots that are of a second type and a third type. The machine image 422 may be configured in a number of sizes and types. The cache layout module 440 may verify that the type of caching slot available in the physical host is capable of storing the type of machine image 422.

In another example, the machine image 422 may be stored on physical hosts or physical devices associated with individual areas for varying topology layers. The topology layers may include a particular region, zone, data center, server rack, physical host, caching slot, etc. As an example, the cache layout may include a particular zone or a particular data center in the zone that is to store the machine image 422, such as the NAS 470. The topology layers may provide a cache which in turn may provide the reduced launch time for the computing instance.

In one configuration, a request to launch the computing instance may be received in the computing service environment 400. For example, the request may be received from a customer who desires computing services from the computing service environment 400. The machine image 422 associated with the computing instance may be identified as being in a paused state. In other words, a domain creation process for the machine image 422 may be complete, but the domain has not been started for launching the computing instance. The computing instance may be launched by loading the machine image 422 and then switching the machine image 422 from the paused state to a running state, thereby minimizing the launch time for the computing instance. In one example, the most popular machine images or the most recently used machine images may be stored in the paused state in the computing service environment 400. Therefore, launching these machine images may be performed with minimal launch times.

Figure 5:
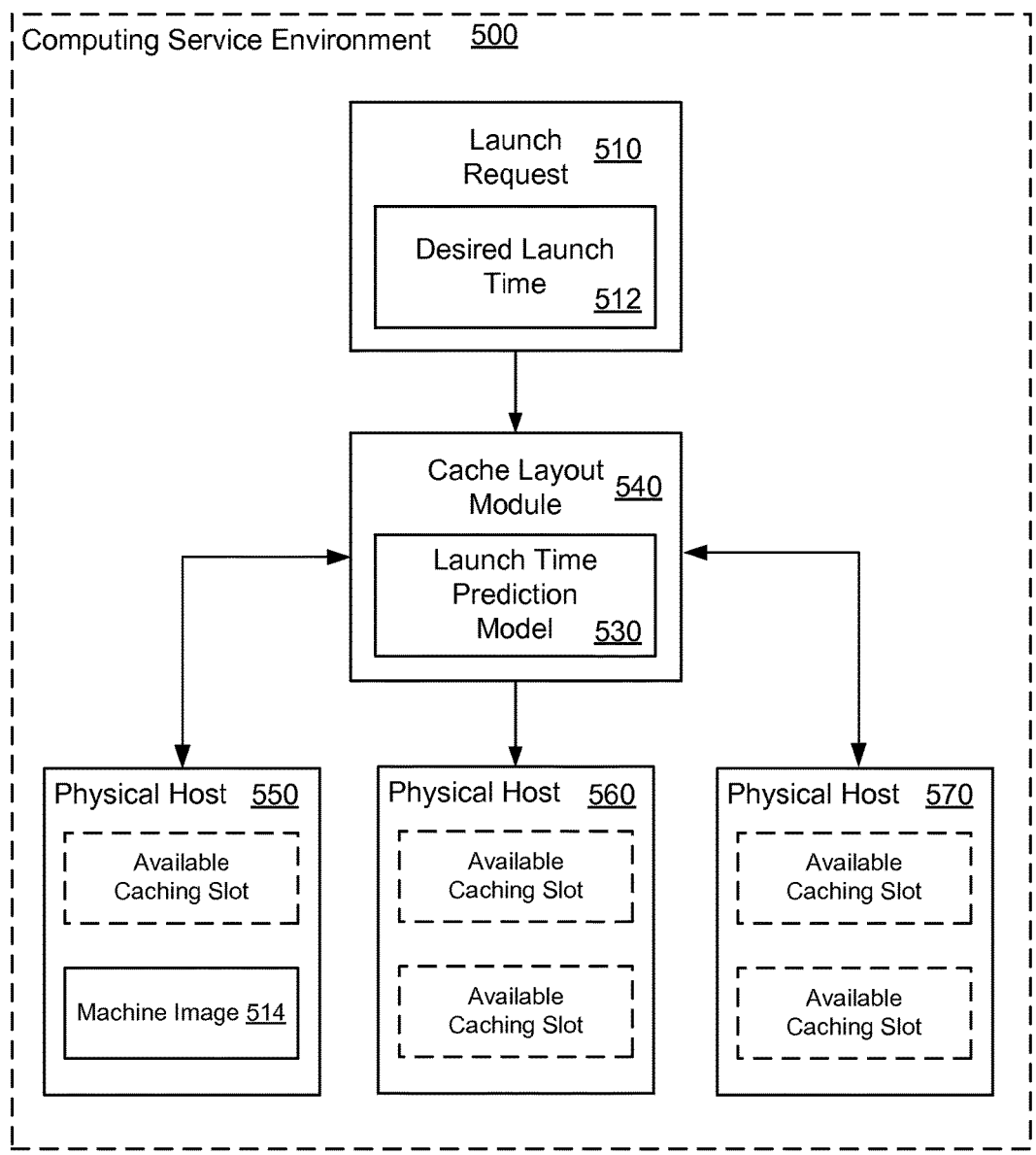
FIG. 5 illustrates a system and related operations for identifying a physical host in a computing service environment for caching a machine image in order to achieve a desired launch time for launching a computing instance according to an example of the present technology.

FIG. 5 illustrates an exemplary system and related operations for caching a machine image 514 in a computing service environment 500 in order to achieve a desired launch time 512 for launching a computing instance associated with the machine image 514. In one example, a customer may provide a launch request 510 that specifies the desired launch time 512 for launching the computing instance. For example, the customer may request that the computing instance be launched in less than 45 seconds.

The launch request 510 may be provided to a cache layout module 540. The cache layout module 540 may determine a cache layout for caching the machine image 514 so that the launch time for the computing instance substantially meets the customer's requirements (e.g., 45 seconds). In other words, the cache layout module 540 may identify physical hosts in the computing service environment 500 that can cache the machine image 514 so that the desired launch time 512 can be achieved.

In one example, the cache layout module 540 may use a launch time prediction model 530 to select which physical host is to cache the machine image 514. The cache layout module 540 may determine whether to cache the machine image 514 on physical host 550, 560 or 570. The cache layout module 540 may predict an estimated launch time for launching the computing instance when the machine image 514 is cached on the physical host 550. The cache layout module 540 may similarly predict the estimated launch times when the machine image 514 is cached on the physical host 560 or cached on the physical host 570. The cache layout module 540, based on information from the launch time prediction model 530, may determine to cache the machine image 514 on the physical host that can provide a launch time that corresponds to the desired launch time 512 specified by the customer. As a non-limiting example, the cache layout module 540 may determine that caching the machine image 514 on the physical host 550 may correspond to the desired launch time 512 (e.g., 45 seconds) for launching the computing instance.

In another example, the desired launch time 512 for launching the computing instance may be received from the customer and, in response, the cache layout module 540 may identify a physical host that has cached the machine image associated with the computing instance to be launched. The cache layout module 540 may use information from the launch time prediction model 530 to determine whether launching the computing instance on the physical host that has cached the machine image complies with the desired launch time 512, and if an predicted launch time complies with the desired launch time 512, the computing instance may be launched on the physical host.

Figure 6:
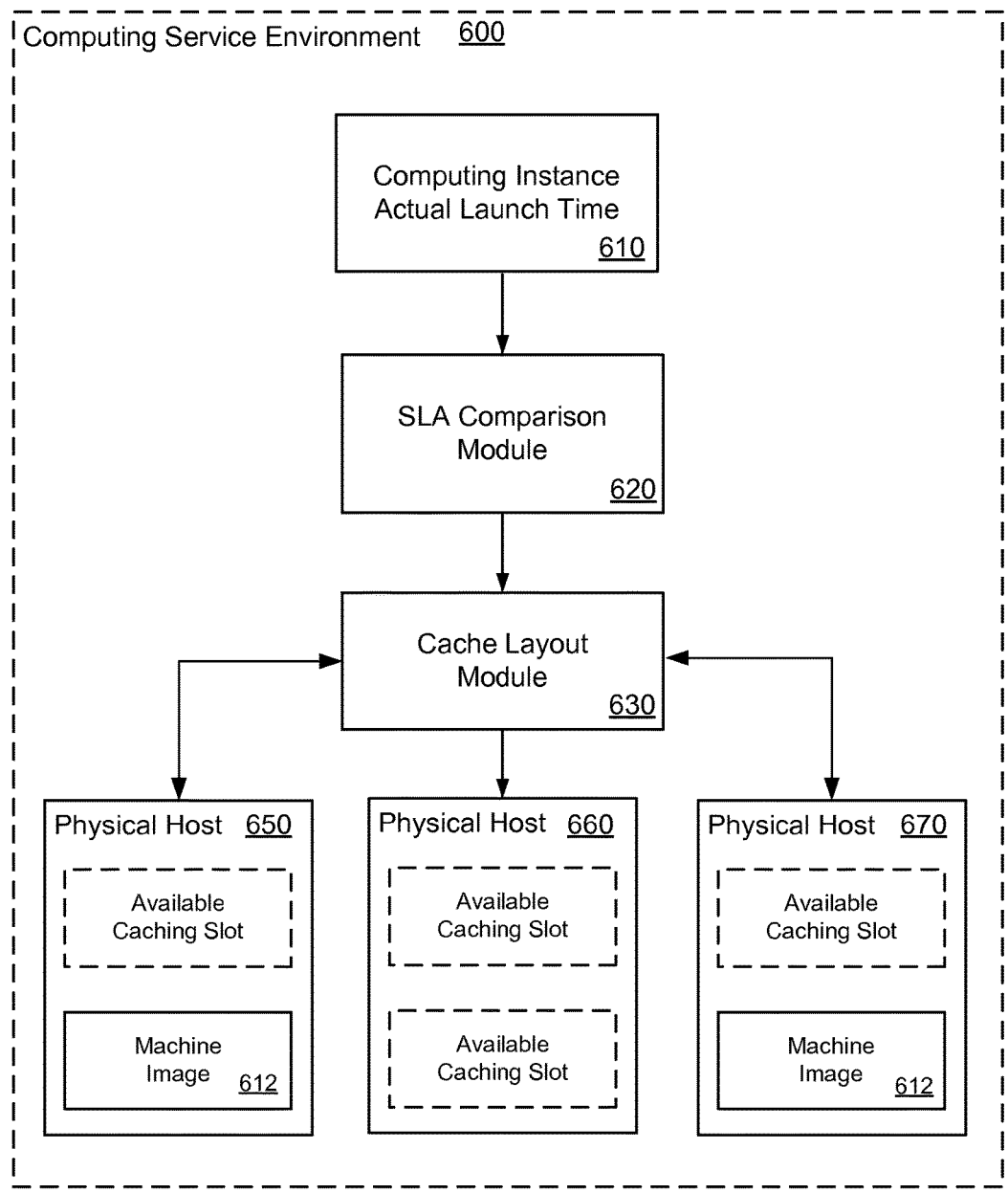
FIG. 6 illustrates a system and related operations for caching machine images in a computing service environment in order to comply with a service level agreement (SLA) for the computing service environment according to an example of the present technology.

FIG. 6 illustrates an exemplary system and related operations for caching machine images in a computing service environment 600 in accordance with a service level agreement (SLA). A computing instance actual launch time 610 may be determined for a computing instance that is launched in the computing service environment 600. The actual launch time for the computing instance may be determined after the computing instance has been successfully launched. The actual launch time for the computing instance may be provided to an SLA comparison module 620. The SLA comparison module 620 may compare the actual launch time for the computing instance with the SLA for the computing service environment 600. In one example, the SLA comparison module 620 may determine that the actual launch time for the computing instance is in accordance with the SLA for the computing service environment 600.

Alternatively, the SLA comparison module 620 may compare the actual launch time for the computing instance with the SLA for the computing service environment 600 and determine that the actual launch time for the computing instance is not in accordance with the SLA for the computing service environment 600. For example, the SLA may specify that the launch time for the computing instance is to be less than 10 minutes. However, the SLA comparison module may determine that the actual launch time was greater than 10 minutes. When the actual launch time is not in accordance with the SLA, the SLA comparison module 620 may notify a cache layout module 640. The cache layout module 640 may determine a cache layout for caching a machine image 612 associated with the computing instance, such that the launch time for the computing instance aligns with the SLA (e.g., the launch time is reduced). In one example, the cache layout module 640 may modify an existing cache layout by storing the machine image 612 on additional physical hosts in the computing service environment 600. In the example shown in FIG. 6, the cache layout module 640 may store the machine image 612 on a physical host 650 and a physical host 670, but not on a physical host 650, in order to reduce the launch time and comply with the SLA for the computing service environment 600.

Figure 7:
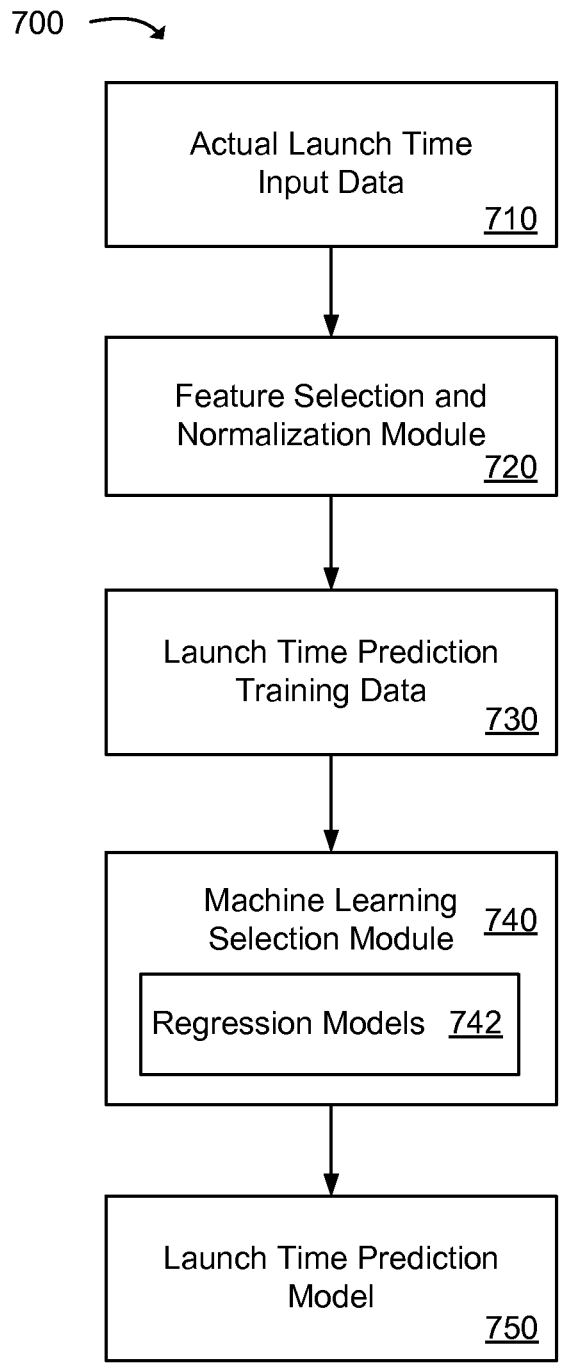
FIG. 7 is a block diagram that illustrates generating a launch time prediction model for predicting launch times for computing instances launched in a computing service environment according to an example of the present technology.

FIG. 7 is an exemplary block diagram 700 that illustrates generating a launch time prediction model 750 to predict launch times for computing instances that are launched in a computing service environment. The launch time prediction model 750 may be a machine learning model that is created using actual launch time prediction data 710. The actual launch time input data 710 may include information (e.g., launch metrics) for a plurality of computing instances that have been previously launched in the computing service environment. So, the actual launch time input data 710 may include historical information relating to previously launched computing instances in the computing service environment. In addition, the actual launch time input data 710 may include historical information for a plurality of physical hosts in the computing service environment. The actual launch time input data 710 may be transformed to be used to train the launch time prediction model 750, as discussed later.

As a non-limiting example, the actual launch time input data 710 may indicate that computing instance A took 60 seconds to launch, while computing instance A was relatively large in size, used a first type of data store, used a 32-bit architecture, and launched on a physical host that was simultaneously launching five other computing instances. As another non-limiting example, the actual launch time input data 710 may indicate that computing instance B took 15 seconds to launch, while computing instance B was relatively small in size, used a second type of data store, used a 64-bit architecture, and launched on a physical host that was not simultaneously launch other computing instances.

The actual launch time input data 710 may be provided to a feature selection and normalization module 720. The feature selection and normalization module 720 may convert the actual launch time input data 710 into model features. In other words, the model features may relate to characteristics of the computing instances that were previously launched and characteristics of the physical hosts upon which the computing instances were previously launched. The model features may be classified as instance features and physical host features.

The instance features may include, but are not limited to, sizes of the computing instances, machine images used by the computing instance (e.g., a machine images or kernel images), whether the machine images are cached or not cached in a physical host when the computing instances are launched, architecture types of the computing instances (e.g., 32-bit architectures or 64-bit architectures), virtualization types of the computing instances (e.g., paravirtualization or hardware virtual machines), and types of data stores used by the computing instances. The instance features may include user-controlled features, such as type of operating systems (OS) and networking types (e.g., virtual private cloud) used for launching the computing instances.

The physical host features may include, but are not limited to, a maximum number of computing instances the physical host can host, a hardware type associated with the physical host, a hardware vendor associated with the physical host, a percentage occupancy at the physical host when the computing instance is to be launched, and a zone in which the physical host is located. The physical host features may include an average, minimum and maximum number of pending computing instances and/or running computing instances on the physical host that launches the computing instance (i.e., a target physical host). In addition, the physical host features may include a number of computing instances that are currently in a pending state and/or a running state on the physical host that launches the computing instance (i.e., the target physical host).

The feature selection and normalization module 720 may normalize the model features (i.e., adjust values measured on different scales to a notionally common scale) in order to create launch time prediction training data 730. The launch time prediction training data 730 may represent aggregated features for the plurality of computing instances identified in the launch time prediction input data 710. The launch time prediction training data 730 may be provided to a machine learning selection module 740. The machine learning selection module 740 may use the launch time prediction training data 730 to train various machine learning models 742. For example, a regression model may be trained. The regression models 742 may include, but are not limited to, support vector machines, stochastic gradient descent, adaptive boosting, extra trees, and random forest. The various regression models 742 may correspond to the launch time prediction training data 730 with various levels of success. In one example, a random forest regressor may provide a relatively high rate of accuracy with respect to the launch time prediction training data 730, and therefore, the machine learning selection module 740 may use the random forest regressor when estimating launch times for computing instances.

The launch time prediction model 750 may receive a request to launch a computing instance, and based on the instance features and the physical host features associated with the computing instance, the launch time prediction model 750 may predict the launch time for the computing instance. In one example, the launch time prediction model 750 may determine that the number of simultaneous computing instance launches on the same physical host, the type of data stored used by the computing instance, the architecture type used by the computing instance and the machine image associated with the computing instance may have a greater effect on the launch time for the computing instance as compared to the other model features.

In some cases, the predicted launch time from the computing instance may diverge from an actual launch time of the computing instance. The instance features and the physical host features associated with the computing instance, as well as the actual launch time to launch the computing instance, may be used to further train the launch time prediction model 750 in order to improve future launch time predictions.

Figure 8:
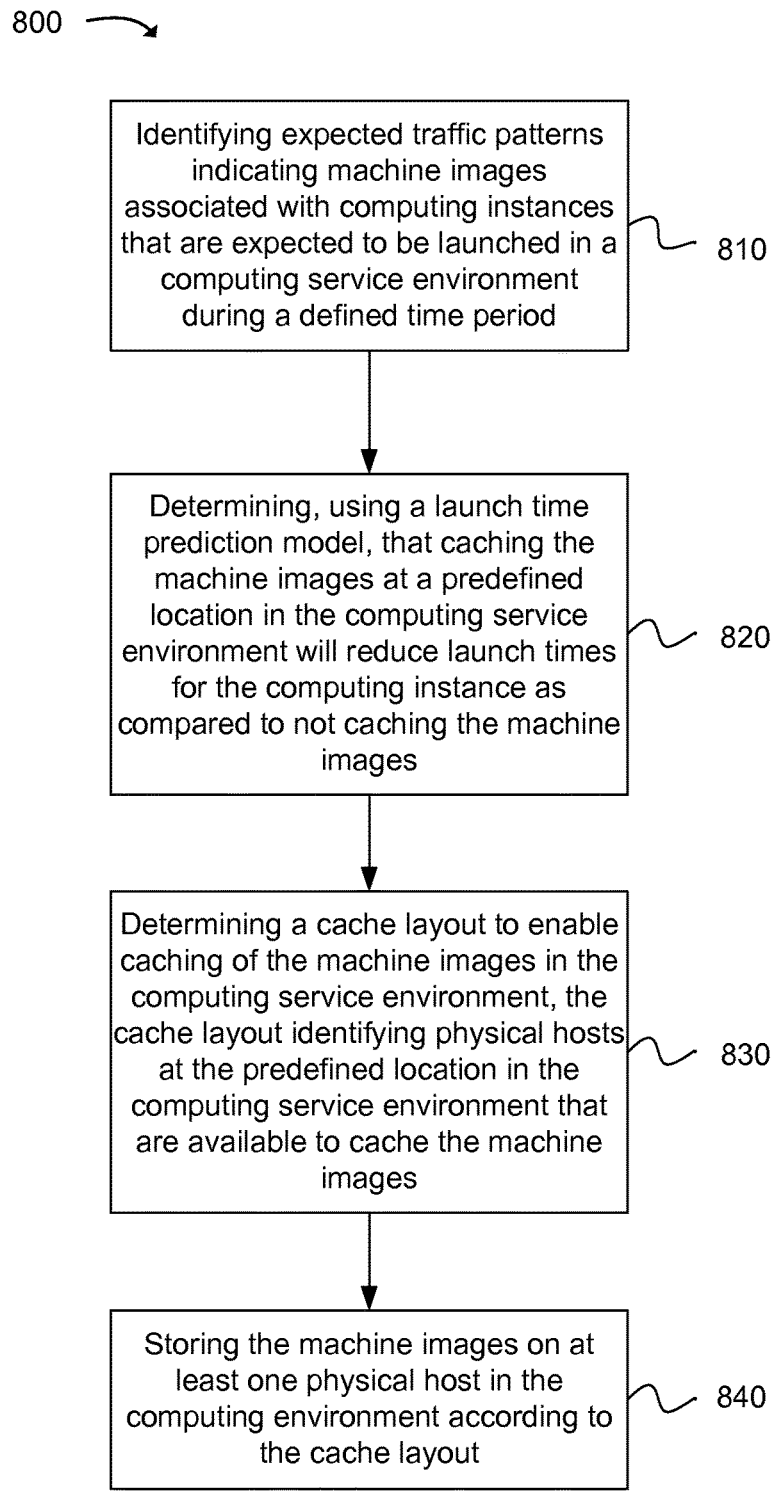
FIG. 8 is a flowchart of an example method for reducing computing instance launch times.

FIG. 8 is a flow diagram illustrating an example method for reducing computing instance launch times. Expected traffic patterns in a computing service environment may be identified, as in block 810. The expected traffic patterns may indicate machine images associated with computing instances that are expected to be launched in the computing service environment during a defined time period. In one example, heuristic rules may be used to identify the expected traffic patterns for the computing service environment. The heuristic rules may relate to historical traffic patterns for the computing service environment.

The machine images may be determined to be cached in a predefined location in the computing service environment in order to reduce launch times for the computing instances as compared to not caching the machine images, as in block 820. In other words, caching the machine image local to a physical host that is launching the computing instance may provide for a relatively faster launch time as compared to fetching the machine image from a data store over a network. In one example, a launch time prediction model may be used for determining to cache the machine image at the predefined location.

A cache layout to enable caching of the machine images in the computing service environment may be determined, as in block 830. The cache layout may identify physical hosts at the predefined location in the computing service environment that are available to cache the machine image. The cache layout may identify a physical host that is available to cache the machine image or a group of physical hosts that are available to each cache a copy of the machine image.

The machine images may be stored on at least one physical host in the computing environment according to the cache layout, as in block 840. Storing the machine image on the physical host may reduce the launch time for launching the computing instance. In one example, the machine image may be stored on multiple physical hosts in order to reduce the launch time for multiple computing instances based on the same machine image.

In one example, a desired launch time for launching the computing instance may be received, and the cache layout may be determined to enable caching of the machine image so an actual launch time for launching the computing instance is substantially similar to the desired launch time. In yet another example, various types of machine images that are to be cached in the computing service environment may be identified, and the cache layout may be determined to include one or more caching slots on the physical host that are capable of caching the various types of machine images.

Figure 9:
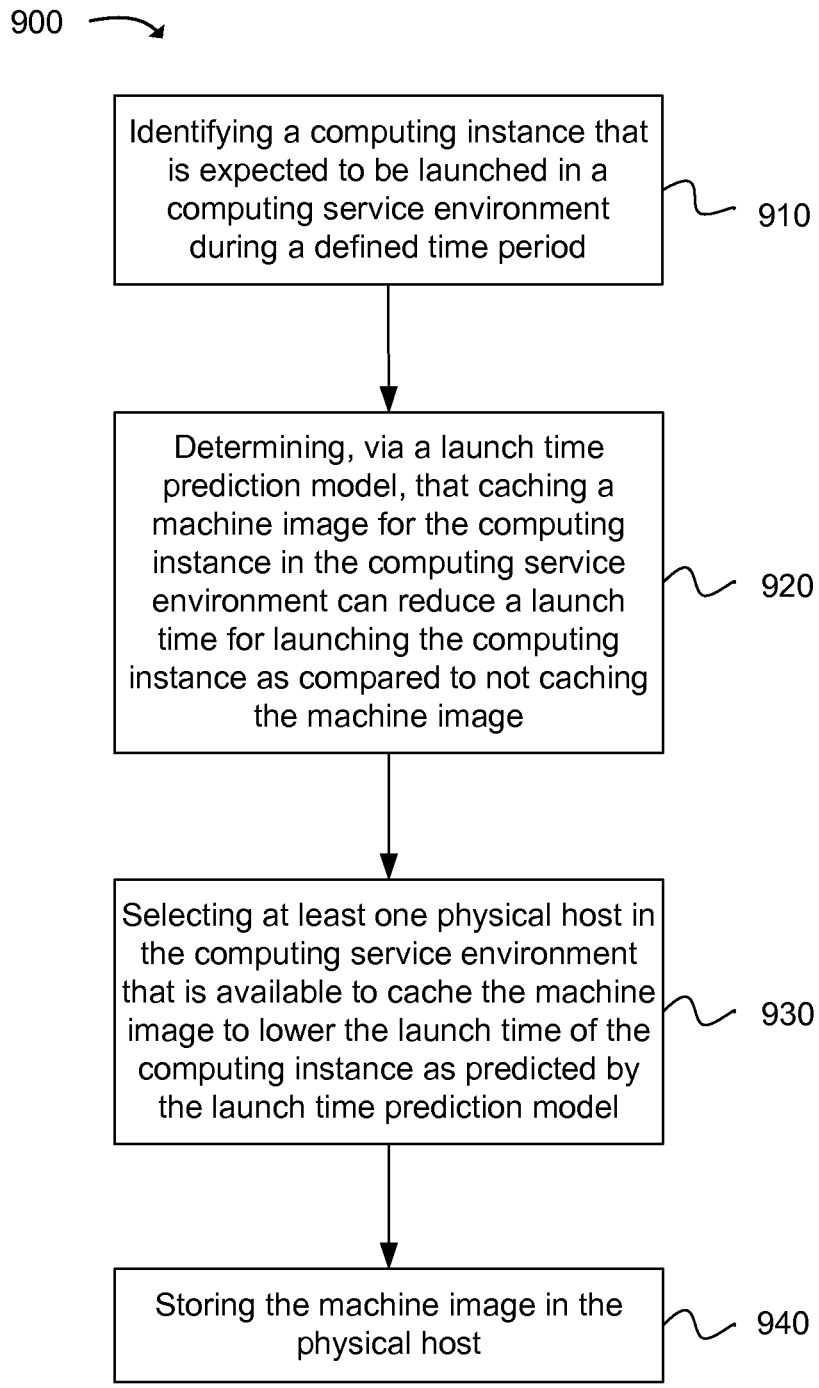
FIG. 9 is a flowchart of another example method for reducing computing instance launch times.

FIG. 9 is a flow diagram illustrating another example method for reducing computing instance launch times. A computing instance that is expected to be launched in a computing service environment during a defined time period may be identified, as in block 910. In one example, heuristic rules may be used to identify the computing instance that is expected to be launched in the computing service environment. The heuristic rules may relate to historical traffic patterns for the computing service environment. In one example, the computing instance that is expected to be launched in the computing service environment during the defined time period may be identified using a machine learning model that predicts expected traffic patterns for the computing service environment.

A determination may be made to cache the machine image in the computing service environment in order to reduce a launch time for launching the computing instance as compared to not caching the machine image, as in block 920. In one example, a launch time prediction model may be used for determining to cache the machine image. The launch time prediction model may be a regression model that predicts the launch time for the computing instance based in part on instance features associated with the computing instance and physical host features associated with a group of physical hosts in the computing service environment.

At least one physical host in the computing service environment that is available to cache the machine image for the computing instance may be selected using the launch time prediction model, as in block 930. In addition, the physical host may be capable of caching the machine image (e.g., the physical host includes available storage slots that are of sufficient capacity to cache the machine image).

The machine image may be stored in the physical host, as in block 940. The machine image may be stored on the physical host in order to reduce the launch time for launching the computing instance. In one example, the machine image may be stored on physical hosts or physical storage devices in the computing service environment according to a selected topology layer. In another example, the machine image may be stored according to a cache layout. The cache layout may indicate a plurality of physical hosts in the computing service environment that are available to cache the machine image in order to reduce the launch time for the computing instance(s). In yet another example, the machine image may be stored on the physical host so that the launch time for the computing instance is in accordance with a service level agreement (SLA) for the computing service environment.

In one configuration, a request to launch the computing instance may be received. The machine image associated with the computing instance that is cached on the physical host in the computing service environment may be identified. The machine image may be loaded on the physical host in order to provide a computing service. In another configuration, a size of the machine image to be cached in the computing service environment may be identified. The physical host in the computing service environment having a slot that is capable of caching machine images of that size may be selected. The machine image may be cached at a predefined location in the computing service environment in order to reduce the launch time associated with the machine image.

In one example, a desired launch time for launching the computing instance may be identified. The desired launch time may be received from a customer accessing the computing service environment. The physical host in the computing service environment that is available to store the machine image associated with the computing instance may be selected. The physical host may be verified as being able to launch the computing instance in accordance with the desired launch time using the launch time prediction model. The machine image may be stored in the physical host in the computing environment so an actual launch time for launching the computing instance is substantially similar to the desired launch time.

In another example, the launch time for the computing instance may be determined to not be in accordance with a service level agreement (SLA) for the computing service environment. The machine image associated with the computing instance may be stored on additional physical hosts in the computing service environment to further reduce the launch time for the computing instance in order to comply with the SLA. The storage of the machine image on additional physical hosts may reduce the launch time when multiple computing instances are simultaneously launched. In addition, storing the machine image on additional physical hosts may allow a physical host providing a relatively lowest launch time to be selected for launching the computing instance. In yet another example, a request to launch the computing instance in the computing service environment may be received. The machine image associated with the computing instance may be identified as being in a paused state. The computing instance may be launched in the computing service environment by switching the machine image from the paused state to a running state, thereby minimizing the launch time for launching the computing instance in the computing service environment.

Figure 10:
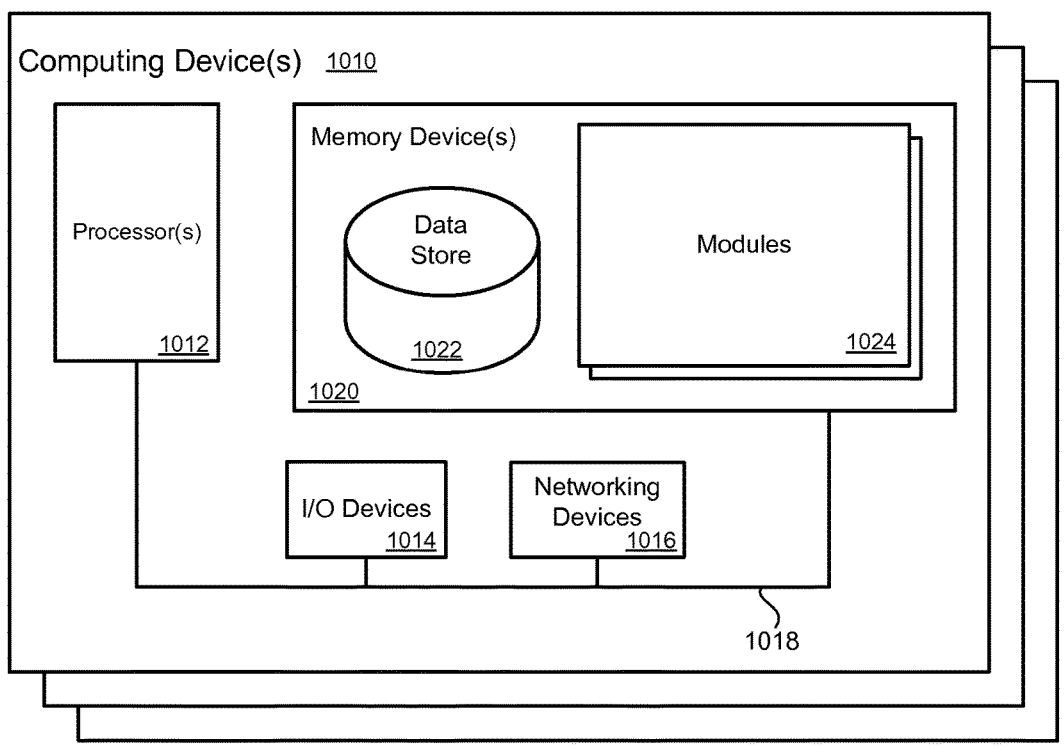
FIG. 10 is block diagram illustrating a computing device that may be employed in the present technology.

FIG. 10 illustrates a computing device 1010 on which modules of this technology may execute. A computing device 1010 is illustrated on which a high level example of the technology may be executed. The computing device 1010 may include one or more processors 1012 that are in communication with memory devices 1020. The computing device may include a local communication interface 1018 for the components in the computing device. For example, the local communication interface may be a local data bus and/or any related address or control busses as may be desired.

The memory device 1020 may contain modules 1024 that are executable by the processor(s) 1012 and data for the modules 1324. The modules 1024 may execute the functions described earlier. A data store 1022 may also be located in the memory device 1020 for storing data related to the modules 1024 and other applications along with an operating system that is executable by the processor(s) 1012.

Other applications may also be stored in the memory device 1020 and may be executable by the processor(s) 1012. Components or modules discussed in this description that may be implemented in the form of software using high programming level languages that are compiled, interpreted or executed using a hybrid of the methods.

The computing device may also have access to I/O (input/output) devices 1014 that are usable by the computing devices. An example of an I/O device is a display screen that is available to display output from the computing devices. Other known I/O device may be used with the computing device as desired. Networking devices 1016 and similar communication devices may be included in the computing device. The networking devices 1016 may be wired or wireless networking devices that connect to the internet, a LAN, WAN, or other computing network.

The components or modules that are shown as being stored in the memory device 1020 may be executed by the processor 1012. The term "executable" may mean a program file that is in a form that may be executed by a processor 1012. For example, a program in a higher level language may be compiled into machine code in a format that may be loaded into a random access portion of the memory device 1020 and executed by the processor 1012, or source code may be loaded by another executable program and interpreted to generate instructions in a random access portion of the memory to be executed by a processor. The executable program may be stored in any portion or component of the memory device 1020. For example, the memory device 1020 may be random access memory (RAM), read only memory (ROM), flash memory, a solid state drive, memory card, a hard drive, optical disk, floppy disk, magnetic tape, or any other memory components.

The processor 1012 may represent multiple processors and the memory 1020 may represent multiple memory units that operate in parallel to the processing circuits. This may provide parallel processing channels for the processes and data in the system. The local interface 1018 may be used as a network to facilitate communication between any of the multiple processors and multiple memories. The local interface 1018 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A non-transitory machine readable storage medium having instructions embodied thereon, the instructions being executed by a processor to improve computing instance launch times, comprising:
   identifying expected traffic patterns indicating machine images associated with computing instances that are expected to be launched in a computing service environment during a defined time period;
   determining, using a launch time prediction model, that caching the machine images at a predefined location in the computing service environment will reduce launch times for the computing instances as compared to not caching the machine images;
   determining a cache layout to enable caching of the machine images in the computing service environment, the cache layout identifying physical hosts at the predefined location in the computing service environment that are available to cache the machine images; and
   storing the machine images on at least one physical host in the computing environment according to the cache layout.

2. A non-transitory machine readable storage medium as in claim 1, further comprising using heuristic rules to identify the expected traffic patterns for the computing service environment, the heuristic rules relating to historical traffic patterns for the computing service environment.

3. A non-transitory machine readable storage medium as in claim 1, further comprising:
   receiving a desired launch time for launching a computing instance; and
   determining the cache layout to enable caching of a machine image associated with the computing instance so an actual launch time for launching the computing instance is substantially similar to the desired launch time.

4. A non-transitory machine readable storage medium as in claim 1, further comprising:
   identifying various types of machine images that are to be cached in the computing service environment; and
   determining the cache layout to include one or more slots on the physical host that are capable of caching the various types of machine images.

5. A computer implemented method, comprising:
   under control of one or more computer systems configured with executable instructions:
   identifying a computing instance that is expected to be launched in a computing service environment during a defined time period, using one or more processors of the computer systems;
   determining, via a launch time prediction model, that caching a machine image for the computing instance in the computing service environment will reduce a launch time for launching the computing instance as compared to not caching the machine image, using the one or more processors of the computer systems;
   selecting a cache layout that includes at least one physical host in the computing service environment that is available to cache the machine image to lower the launch time of the computing instance as predicted by the launch time prediction model, using the one or more processors of the computer systems; and
   storing the machine image in the physical host, using the one or more processors of the computer systems.

6. The method of claim 5, further comprising:
receiving a request to launch the computing instance;
identifying the machine image associated with the computing instance that is cached on the physical host in the computing service environment; and
loading the machine image on the physical host in order to provide a computing service.

7. The method of claim 5, further comprising using heuristic rules to identify expected traffic patterns for the computing service environment, the heuristic rules relating to historical traffic patterns for the computing service environment.

8. The method of claim 5, further comprising identifying the computing instance that is expected to be launched in the computing service environment during the defined time period and a defined geographical location using a machine learning model that predicts expected traffic patterns for the computing service environment.

9. The method of claim 5, further comprising:
identifying a size of the machine image to be cached in the computing service environment;
selecting the physical host in the computing service environment having a slot that is capable of caching machine images of that size, the machine image being cached at a predefined location in the computing service environment in order to reduce the launch time associated with the machine image.

10. The method of claim 5, further comprising storing the machine image on the computing service environment according to a selected topology layer.

11. The method of claim 5, wherein the cache layout indicates a plurality of physical hosts in the computing service environment that are available to cache the machine image in order to reduce the launch time.

12. The method of claim 5, further comprising:
identifying a desired launch time for launching the computing instance;
selecting the physical host in the computing service environment that is available to store the machine image associated with the computing instance; and
storing the machine image in the physical host in the computing environment so an actual launch time for launching the computing instance is substantially similar to the desired launch time.

13. The method of claim 5, further comprising storing the machine image on the physical host so that the launch time is in accordance with a service level agreement (SLA) for the computing service environment.

14. The method of claim 5, further comprising:
determining that the launch time for the computing instance is not in accordance with a service level agreement (SLA) for the computing service environment; and
storing the machine image associated with the computing instance on additional physical hosts in the computing service environment to further reduce the launch time for computing instances associated with the machine image in order to comply with the SLA.

15. The method of claim 5, further comprising:
receiving a request to launch the computing instance in the computing service environment;
identifying that the machine image associated with the computing instance is in a paused state; and
launching the computing instance in the computing service environment by switching the machine image from the paused state to a running state, thereby minimizing the launch time for launching the computing instance in the computing service environment.

16. The method of claim 5, wherein the launch time prediction model is a regression model that predicts the launch time for the computing instance based in part on instance features associated with the computing instance and physical host features associated with a group of physical hosts in the computing service environment.

17. A system for reducing computing instance launch times, comprising
a processor;
a memory device including instructions that, when executed by the processor, cause the system to:
identify expected traffic patterns in a computing service environment, the expected traffic patterns indicating a machine image associated with a computing instance that is expected to be launched in the computing service environment during a defined time period;
determine, using a launch time prediction model, that caching the machine image in a predefined location in the computing service environment will reduce a launch time for the computing instance as compared to not caching the machine image;
determine a cache layout to enable caching of the machine image in the computing service environment, the cache layout identifying physical hosts at the predefined location in the computing service environment that are available to cache the machine image; and
store the machine image on at least one physical host in the computing environment according to the cache layout.

18. The system of claim 17, wherein the memory device including instructions that, when executed by the processor, cause the system to store the machine image on the physical host so that the launch time is in accordance with a service level agreement (SLA) for the computing service environment.

19. The system of claim 17, wherein the memory device including instructions that, when executed by the processor, cause the system to store the machine image on the computing service environment according to a selected topology layer.

20. The system of claim 17, wherein the memory device including instructions that, when executed by the processor, cause the system to:
receive a request to launch the computing instance;
identify the machine image associated with the computing instance that is cached on the physical host in the computing service environment; and
load the machine image in order to provide a computing service.

* * * * *